United States Patent
Hausberger et al.

(10) Patent No.: US 6,767,650 B2
(45) Date of Patent: Jul. 27, 2004

(54) LIGHTWEIGHT SUPPORT FOR BUMPERS

(75) Inventors: Klaus Hausberger, Graz (AT); Guntram Ruef, Graz (AT); Bruno Götzinger, Weinitzen (AT); Thomas Friesenbichler, Graz (AT)

(73) Assignee: Magna Steyr Fahrzeugtechnik AG & Co. KG, Graz (AT)

( * ) Notice: Subject to any disclaimer, the term of this patent is extended or adjusted under 35 U.S.C. 154(b) by 0 days.

(21) Appl. No.: 10/316,239

(22) Filed: Dec. 9, 2002

(65) Prior Publication Data

US 2004/0108736 A1 Jun. 10, 2004

(51) Int. Cl.⁷ .......................... B60R 19/02; B60R 19/18
(52) U.S. Cl. ...................... 428/598; 428/586; 428/34.1; 293/102; 72/253.1; 72/256
(58) Field of Search ................................ 428/598, 586, 428/34.1; 293/102; 72/253.1, 256

(56) References Cited

U.S. PATENT DOCUMENTS 5,340,178 A * 8/1994 Stewart et al. .............. 293/122
5,397,115 A * 3/1995 Vlahovic ..................... 296/29

FOREIGN PATENT DOCUMENTS

| EP | 0687743 | * 12/1995 |
| JP | 05-310092 | * 11/1993 |
| JP | 07-205655 | * 8/1995 |
| JP | 08-047725 | * 2/1996 |
| JP | 08-099591 | * 4/1996 |
| JP | 09-175290 | * 7/1997 |
| JP | 2000-052898 | * 2/2000 |
| JP | 2000-335334 | * 12/2000 |

* cited by examiner

*Primary Examiner*—John J. Zimmerman
(74) *Attorney, Agent, or Firm*—Bachman & LaPointe, P.C.

(57) ABSTRACT

A lightweight support for a bumper is formed by an extruded profile with a plurality of chambers. In order to provide a profile which, along with an extremely low weight, meets all the static requirements, is easy to bend and is suited to the properties of a light-metal alloy, the profile (1) comprises four walls (2, 3, 5, 6), which preferably form an isosceles trapezoid, and two webs (7, 8), which are arranged in the interior of the profile, parallel to the side walls (5, 6) and likewise symmetrically. The side walls (5, 6) of the support (1) have stiffening ribs (25) which are produced in the same operation as the support (1) is bent. A description is given of the associated process.

15 Claims, 4 Drawing Sheets

LIGHTWEIGHT SUPPORT FOR BUMPERS

BACKGROUND OF THE INVENTION

The invention relates to a lightweight support for bumpers of motor vehicles, formed by an extruded profile, with a plurality of chambers, made of a light metal. It is possible for the lightweight supports themselves to form bumpers or to support a bumper positioned in front of them or, more generally, the front part of a vehicle over the entire vehicle width. For this purpose, they are usually bent into the corresponding shape.

Such supports have to meet more and more stringent requirements in respect of economy, esthetics and safety. They are intended, on the one hand, to have the lowest weight possible and to be capable of being easily shaped as desired by the designers and, on the other hand, to meet the high strength-related requirements: bending strength, torsional strength as well as, in particular, energy absorption and deformation path in the event of a collision. In this case, for reasons of safety and of the repair costs for the various types of deformation, a reproducible transition at a certain collision speed and a certain time sequence for the deformation are sought. Moreover, connecting the support to the vehicle body via further deformable elements is intended to produce a favorable force flux.

U.S. Pat. No. 5,340,178 discloses such a support. The latter may consist of aluminum, magnesium or plastic material. Its profile is essentially rectangular, with two flattened edges and an S-shaped reinforcing rib. However, the profile, as a whole, is not particularly suitable for attachment to the vehicle body and for bending during production. The operation of bending the support into the desired shape has to take place under high internal pressure or with the use of a core because, otherwise, there is excessive deformation of the wall in the tension zone and of the S-shaped reinforcing rib.

In the aim of achieving a maximum level of energy absorption along with a minimum weight, magnesium or a magnesium alloy provides further advantages. The properties of the latter, however, differ vastly from those of aluminum or plastic. They have a smaller modulus of elasticity and a lower structural strength, on account of their hexagonal grid structure, and display different deformation behavior. In the case of deformation at room temperature (which is to be preferred for cost reasons alone), it is only possible for sliding to take place in three sliding directions in the base plane of the hexagonal basic grid. The profile described in U.S. Pat. No. 5,340,178 is not suited to the properties of magnesium alloys; the deformation in the non-supported tension zone would be too great in the case of said deformation behavior and would result in the support rupturing.

The object of the invention is to develop a support of the generic type which, along with an extremely low weight, meets all the static and dynamic requirements, is easy to bend during production and also allows for the particular properties of a magnesium alloy.

SUMMARY OF THE INVENTION

The object is achieved according to the invention wherein the profile comprises two transverse walls and side walls, which are essentially symmetrical in relation to an axis of symmetry, and two webs, which webs are arranged in the interior of the profile and parallel to the side walls.

The webs of the profile, which are symmetrical and parallel to the side walls, increase the energy absorption and support the transverse walls located in the tension and compression zones, without prematurely buckling or collapsing. This cannot be said of the S-shaped reinforcing rib according to the prior art. During the bending operation, it is then also the case that the support need not be protected by internal pressure against collapsing or subsequently calibrated. This reduces the production costs to a quite considerable extent. As a result, the profile according to the invention is also suitable for the use of a wrought magnesium alloy, and allows the advantages of this material to be utilized without it being necessary to accept the disadvantages thereof.

In a preferred configuration, the walls of the profile form essentially an isosceles trapezoid, and the webs are parallel to the side walls, which form the legs of the trapezoid. The trapezoidal shape aids the torsion of the support, in particular, if the longer of the parallel trapezoid sides is directly subjected to an impact. This improves the transmission of the forces to the vehicle body via the shorter of the parallel trapezoid sides. The inclination of the trapezoid legs and of the webs facilitates the buckling thereof, which starts at a certain impact energy, with maximum energy absorption. The webs, which are parallel to the legs of the trapezoid, support the longer of the parallel trapezoid sides under the action of the impact such that said longer side does not collapse either.

The angle of inclination of the webs in relation to the plane of symmetry of the isosceles trapezoid is preferably from 10 to 30, preferably 15 to 20, angular degrees, depending on the bending radius of the support in the plane of symmetry.

In a development of the idea of the invention for trapezoidal profiles, the webs form an accumulation of material at their transition to the shorter trapezoid side. This forms a junction which increases the buckling strength of the profile in the compression zone, increases the moment of inertia during bending by a force in the plane of symmetry, shifts the shear center further into the compression zone during torsional loading and, during extrusion, helps to even out the flow speeds.

In a particularly advantageous development of the invention in which the lightweight support is bent in the plane of symmetry, the side walls and the webs have stiffening ribs, which run transversely to the longitudinal extent of said lightweight support. These stiffening ribs further increase the strength and energy absorption of the support to an unexpectedly high extent, which has been established in tests. This allows a reduction in the wall thicknesses, and thus in the weight, to the limits of what is possible during extrusion. Thus, the wall thicknesses are preferably from 0.02 to 0.05 times the profile height along the axis of symmetry.

The support is preferably bent in the plane of symmetry, the shorter trapezoid side of the profile being on the concave side of the bent lightweight support. The profile according to the invention, however, also allows three-dimensional shaping, for example bending out of the plane of symmetry.

In certain applications, it is advantageous for the purpose of optimizing weight and deformation behavior if the webs have a lesser wall thickness than the walls forming the trapezoid and/or if at least one of the rounding radii in the interior of the profile is smaller than double the wall thickness of an adjacent wall. The latter, if the profile is regarded two-dimensionally, corresponds to less rigid clamping, with which the buckling load can be coordinated.

The invention, however, also relates to a process for producing the lightweight support according to the invention in the embodiment with the stiffening ribs. It has, surprisingly, been found that the latter are produced, in the case of the profile shape according to the invention, during bending, without a separate operation. In particular, the stiffening ribs, during bending in a die, become particularly effective and regular if the support has a trapezoidal profile. This may be explained by the oblique side walls being supported to an increasing extent on the die during the bending operation.

BRIEF DESCRIPTION OF THE DRAWINGS

The invention is explained and described hereinbelow with reference to drawings of a preferred exemplary embodiment. In the drawings.

DETAILED DESCRIPTION

Figure 1:
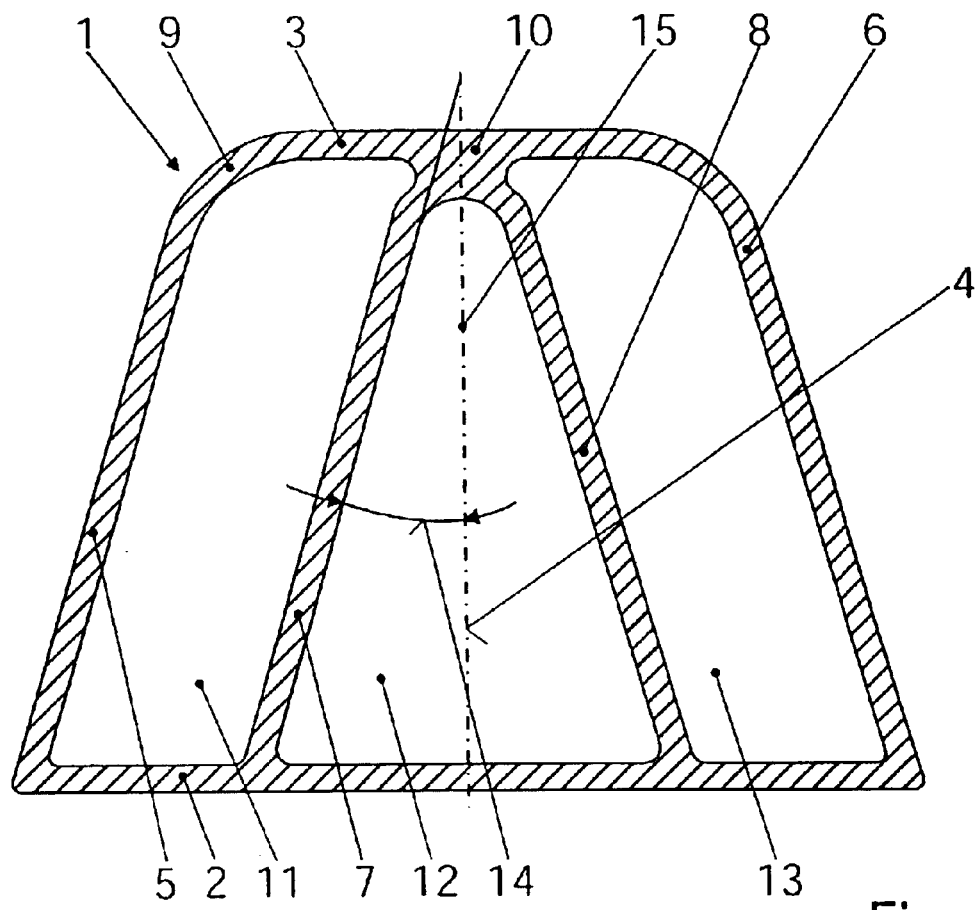
FIG. 1 illustrates a profile according to the invention as a cross section of the support.

In FIG. 1, the trapezoid of the section through the lightweight support 1 comprises the two parallel trapezoid sides 2, 3, of which 2 is the longer side and 3 is the shorter side, and the two trapezoid legs 5, 6 of the same length. This is thus an isosceles trapezoid with an axis of symmetry 4, which is the line of the intersection of the plane of symmetry of the lightweight support as a whole with the plane of the drawing. A wide rounding is provided at the transition of the trapezoid legs 5, 6 into the shorter parallel trapezoid side 3. Such a rounding could also be provided at the transition to the longer parallel trapezoid side. There is a junction at the transition of the two converging webs 7, 8 into the shorter parallel trapezoid side 3, said junction forming a very much desired accumulation of material 10, 14 designates the angle enclosed by the webs 7, 8, and also the trapezoid legs 5, 6 which are parallel thereto, and the axis of symmetry 4 of the profile. The webs 7, 8 thus subdivide the profile into three chambers 11, 12, 13, 15 designates the shear center of the profile.

Figure 2:
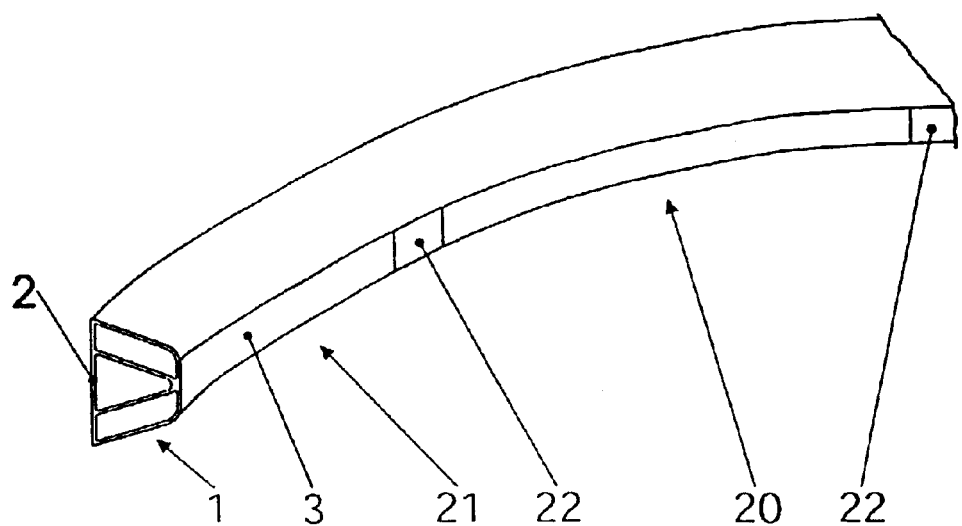
FIG. 2 illustrates a support according to the invention in the deformed state.

FIG. 2 shows the lightweight support 1 over a considerable part of its length, by means of which it is fitted, in accordance with the width of the vehicle, on the front or rear side of the latter. It comprises a part 20, which is rectilinear or bent to a lesser extent, in the center of the vehicle and, adjoining the latter, a part 21, which is bent to a more pronounced extent, toward each side of the vehicle. Merely indicated are the locations 22 at which the support 1 is connected to the vehicle body (not illustrated) or to the deformation elements located therebetween. The longer of the parallel trapezoid sides 2 is convex and forms the outer side; the shorter parallel trapezoid side 3 is concave as a result of the bending and forms the inner side, which is directed toward the vehicle body. The outer side itself may be a visible part of the bumper, but may also bear or support a visible bumper (not illustrated).

Figure 3:
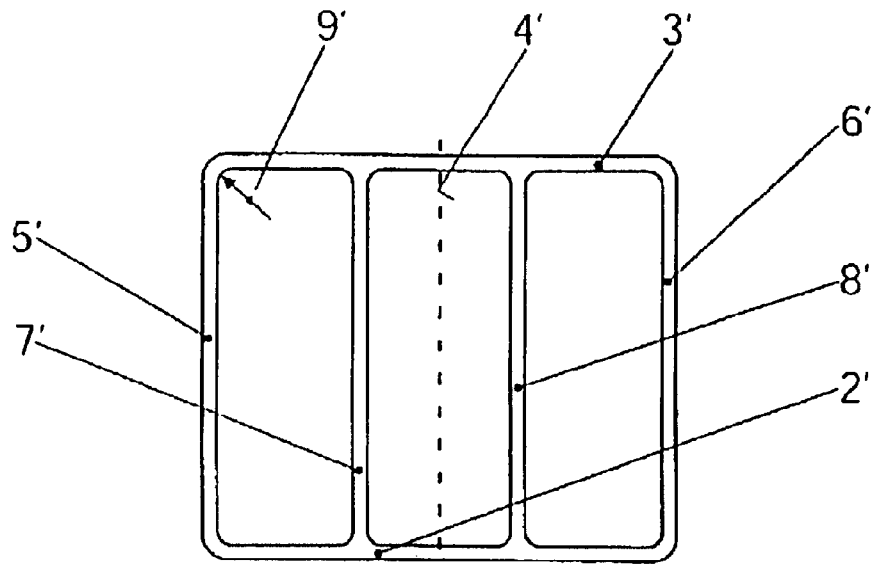
FIG. 3 illustrates a variant of FIG. 1.

FIG. 3 shows a simplified profile of the lightweight support according to the invention. Designations analogous to FIG. 1 are provided with an apostrophe.

Figure 4:
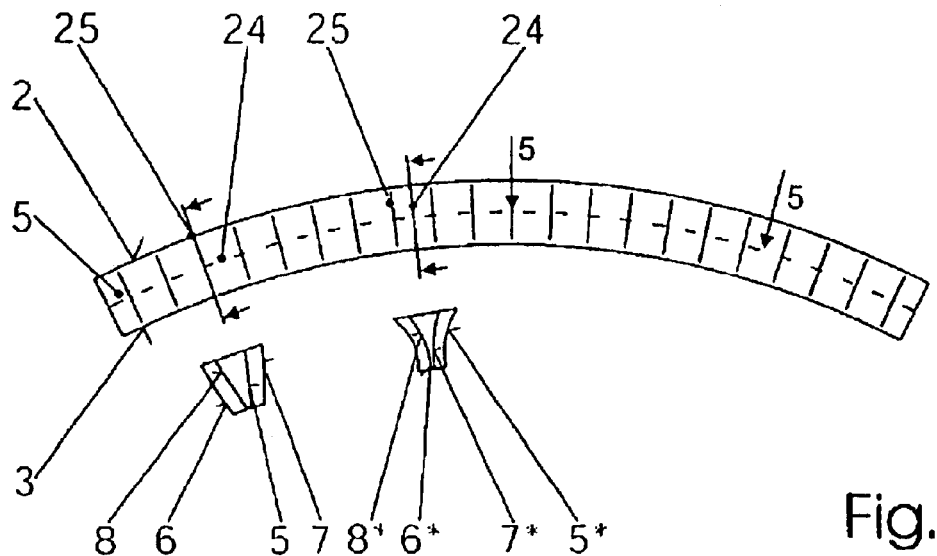
FIG. 4 illustrates a bent support in a preferred embodiment with stiffening ribs.
Figure 5:
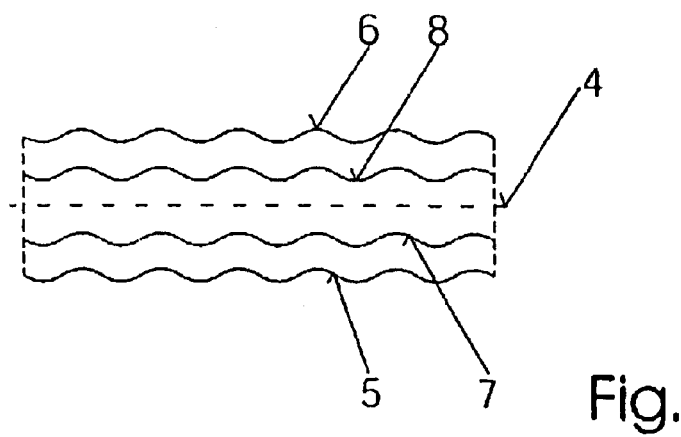
FIG. 5 illustrates a section along 5—5 in FIG. 4.
Figure 9:
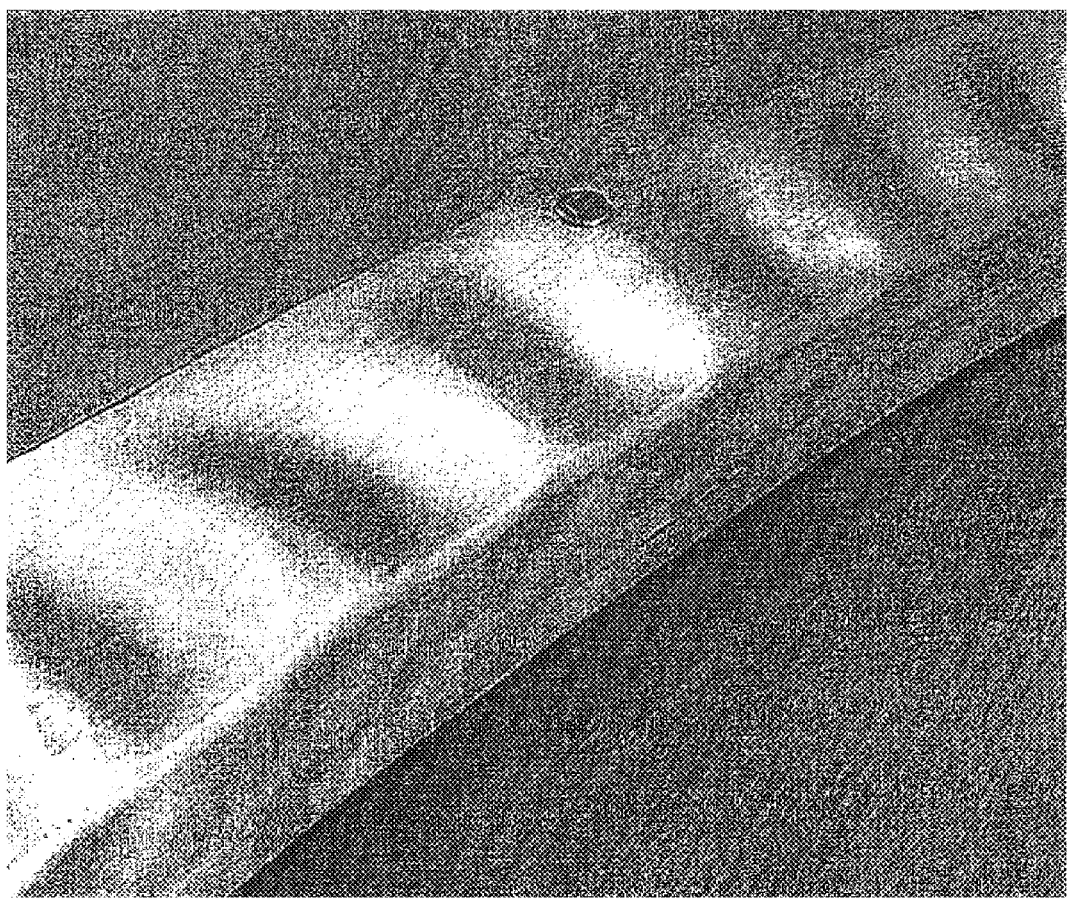
FIG. 9 illustrates a photographic view of a lightweight support which has been bent according to the invention.

FIG. 4 shows the bent support with the stiffening ribs 25, which are formed in the side walls 5, 6 and in the webs 7, 8, transversely to the longitudinal extent of the support. The stiffening ribs 25 are depicted as solid lines which follow one after the other at more or less regular longitudinal intervals, see FIG. 5. Located between them are indents 24; the shape of which can be gathered with reference to the walls 5*, 6* and webs 7*, 8* which are shown in section. At the locations of the stiffening ribs 25, in the other section, the walls 5, 6 and the webs 7, 8 are not deformed in practice. For illustrative purposes, FIG. 9 shows a photographic view of the support which has been bent in this way, a Euro-cent coin having been placed on the support to indicate scale.

Figure 6:
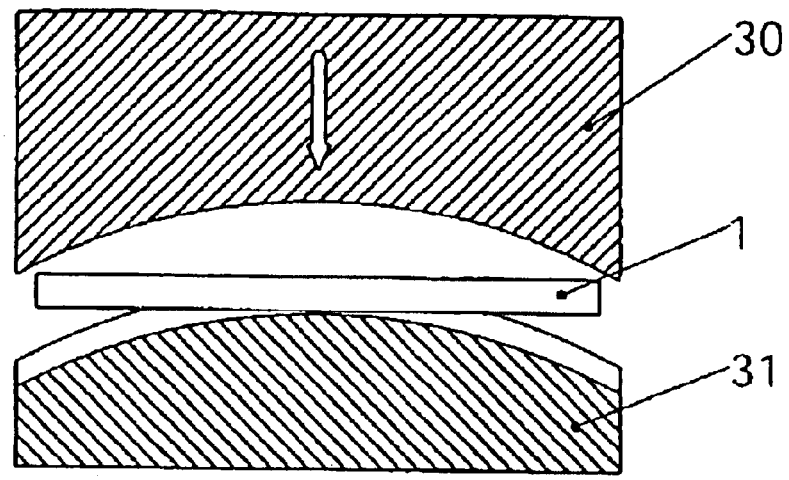
FIG. 6 illustrates a bending die in a first position, for the purpose of explaining the production process.
Figure 7:
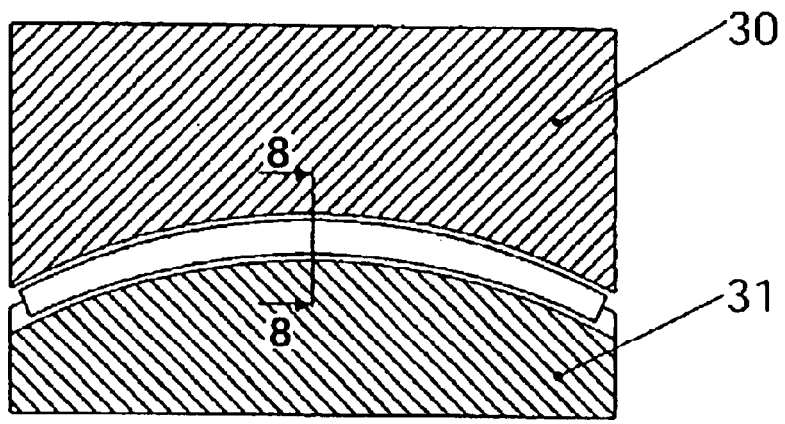
FIG. 7 illustrates the same as FIG. 6, but in a second position.
Figure 8:
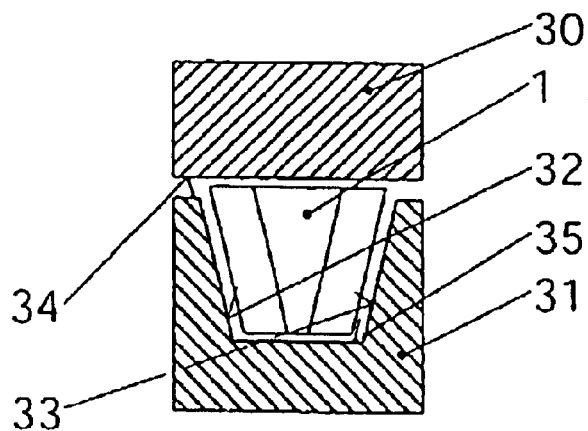
FIG. 8 illustrates a section along 8—8 in FIG. 7.

In FIGS. 6 and 7, the upper mold of a bending die is designated 30 and the lower mold is designated 31, the former Figure showing the state prior to the bending operation and the latter Figure showing the state following bending. It can be seen in the cross section of FIG. 8 that the support 1 is bent between the abutment surfaces 34, 35 of the two dies, the bending starting from the longitudinal center and continuing in the longitudinal direction, in which case the side walls of the profile 1 approach the side walls 32, 33 of the lower mold. This makes it more difficult for the side walls to splay outward, and facilitates the indenting operation, with the result that, at the end of the bending operation, the stiffening ribs 25 butt against the side walls 32, 33 of the lower mold.

The lightweight support preferably consists of a magnesium alloy, for example of the wrought alloy with standard designation AZ31. It is first of all extruded as a rectilinear profile and only then, in a following operation, is it bent, in the cold state, into the desired shape. The stiffening ribs form here by virtue of the shape according to the invention, providing the minimum-weight support with an extremely high strength and level of energy absorption.

What is claimed is:

1. An extruded profile comprises two transverse walls (2, 3; 2', 3') and two side walls (5, 6; 5', 6'), wherein the transverse walls and the side walls are essentially symmetrical in relation to an axis of symmetry (4; 4'), two webs (7, 8; 7', 8'), arranged in the interior of the profile and substantially parallel to the side walls and extending between the transverse walls to define a plurality of chambers within the profile, wherein the transverse walls and the side walls (2, 3, 5, 6) form essentially an isosceles trapezoid, and the webs (7, 8) are arranged in the interior of the trapezoid, substantially parallel to the side walls (5, 6), and form the legs of the trapezoid and are symmetrically and wherein the webs (7, 8) form an accumulation of material (10) at their transition to the shorter trapezoid side (3).

2. An extruded profile comprises two transverse walls (2, 3; 2', 3') and two side walls (5, 6; 5', 6'), wherein the transverse walls and the side walls are essentially symmetrical in relation to an axis of symmetry (4; 4'), two webs (7, 8; 7', 8'), arranged in the interior of the profile and substantially parallel to the side walls and extending between the transverse walls to define a plurality of chambers within the profile, wherein the profile is bent in the plane of symmetry (4; 4'), and wherein the side walls (5, 6; 5', 6') and the webs (7, 8; 7', 8') have stiffening ribs (25), which run transversely to the longitudinal extent of said profile support.

3. The profile as claimed in claim 2, wherein the transverse walls and the side walls (2, 3, 5, 6) form essentially an isosceles trapezoid, and the webs (7, 8) are arranged in the interior of the trapezoid, substantially parallel to the side walls (5, 6), and form the legs of the trapezoid and are symmetrically.

4. The profile as claimed in claims 1 or 2, wherein an angle of inclination (14) of the webs is from 10 to 30 angular degrees with respect to the plane of symmetry (4) of the isosceles trapezoid.

5. The profile as claimed in claims 1 or 2, wherein an angle of inclination (14) of the webs is from 15 to 20 angular degrees with respect to the plane of symmetry (4) of the isosceles trapezoid.

6. The profile as claimed in claim 2, wherein the webs (7, 8) form an accumulation of material (10) at their transition to the shorter trapezoid side (3).

7. The profile as claimed in claim 1, wherein the profile is bent in the plane of symmetry (4; 4'), and wherein the side walls (5, 6; 5', 6') and the webs (7, 8; 7', 8') have stiffening ribs (25), which run transversely to the longitudinal extent of said profile support.

8. The profile as claimed in claims 1 or 2, wherein the profile is bent in the plane of symmetry (4), the transverse wall (3) of the profile (1), which forms the shorter of the parallel transverse wall, is on a concave side of the bent profile.

9. The profile as claimed in claims 1 or 2, wherein the webs (7, 8; 7', 8') have a lesser wall thickness than the side walls (5, 6; 5', 6').

10. The profile lightweight support as claimed in claims 7 or 2, wherein the wall thickness of the transverse walls and side walls (2, 3, 5, 6; 2', 3', 5', 6') is from 0.02 to 0.05 times the profile height along the axis of symmetry (4; 4').

11. The profile as claimed in claims 7 or 2, wherein a rounding radii is provided at the junction of transverse wall and side wall on the interior of the profile wherein the rounding radii is smaller than double the wall thickness of an adjacent wall.

12. The profile as claimed in claims 1 or 2, wherein the profile is formed of a wrought magnesium alloy.

13. A process for producing a profile as claimed in claims 7 or 2, wherein the stiffening ribs (25) are produced at the same time as, and by, the operation of bending the lightweight support.

14. The process for producing a profile as claimed in claim 13, wherein the bending of the profile takes place in a die (30, 31).

15. A profile according to claims 1 or 2, wherein the profile forms a support for a bumper of a vehicle.

* * * * *